United States Patent Office 2,806,877
Patented Sept. 17, 1957

2,806,877
DI CARBOXYLIC AROMATIC COMPOUNDS AND PROCESS FOR MAKING SAME

Donald F. Koenecke and Louis A. Mikeska, Westfield, N. J., assignors to Esso Research and Engineering Company, a corporation of Delaware No Drawing. Application July 30, 1954,
Serial No. 446,975

4 Claims. (Cl. 260—523)

This invention relates to oxygen-containing aromatic compounds and to methods of synthesizing them. More particularly it relates to carboxylic acids obtainable from aromatic alcohols such as benzyl alcohol, bis-hydroxymethyl benzene and the various higher homologues thereof. In its preferred embodiment the invention relates to tetramethyl terephthalic acid and its preparation by oxidation of tetramethyl terephthalyl dialdehyde which in turn can be obtained by oxidation of bis-hydroxymethyl durene.

Aromatic acids, and particularly dibasic acids, represent valuable chemicals which have many potential uses in the preparation of resinous or fiber-forming materials and as intermediates in various chemical syntheses such as the preparation of esters, amides, and the like. However, as a rule, they are difficult to obtain.

It is the object of the present invention to provide new oxygen-containing aromatic acids and to provide a new method for preparing monobasic or dibasic acids by oxidation of the corresponding aldehydes. One of the more specific objects is to provide an effective method for preparing oxygenated durene derivatives, notably tetramethyl terephthalic acid.

The principal reagents used are aromatic aldehydes or dialdehydes such as benzaldehyde, the various mono- or polyalkyl substituted benzaldehydes having one to five alkyl substituents of 1 to about 20 carbon atoms each, such as p-methyl benzaldehyde, 2,5-dimethyl benzaldeyde, tetramethyl benzaldehyde, tridecyl benzaldehyde, tetra (tridecyl) benzaldehyde; the various phthalyl dialdehyde isomers such as ortho-phthalyl dialdehyde or especially terephthalyl dialdehyde, the alkylated homologues thereof having one to four alkyl substituents of 1 to about 20 carbon atoms each such as tetramethyl terephthalyl dialdehyde, and the analogous derivatives of naphthalene and anthracene.

These compounds can be represented by the formula

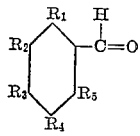

wherein the ring symbolizes a structure selected from the group consisting of benzene, naphthalene and anthracene nuclei; one of said $R_1$ through $R_5$ radicals is selected from the group consisting of hydrogen, alkyl radicals of 1 to 20 carbon atoms, and an aldehyde radical —CHO; and the other four of said $R_1$ through $R_5$ radicals are selected from the group consisting of hydrogen and alkyl radicals of 1 to 20 carbon atoms.

Tetramethyl terephthalyl dialdehyde is particularly preferred because its compact but fully substituted nature and the para position of its two aldehyde groups result in the formation of compounds which are especially valuable in the preparation of linear fiber-forming polymers. Somewhat similar results can also be obtained starting with other cyclic compounds having two aldehyde groups in the para position such as terephthalyl dialdehyde, methylterephthalyl dialdehyde, 2,5-dimethyl terephthalyl dialdehyde, and so on. Furthermore, if the structure of the final product need not be linear, as in molding resins or insecticides, the two aldehyde groups need not be in the para position with respect to each other. In such an event dialdehydes derived from mixed xylenes represent a particularly useful raw material.

Some of the foregoing aromatic aldehydes or dialdehydes are well known and others can be obtained from various sources. For instance, they can be obtained by oxidation of the corresponding alcohol or glycol with the aid of a nitroaromatic compound such as nitrobenzene as described and claimed in copending application of Koenecke and Mikeska, Serial No. 446,974, filed July 30, 1954, which can be considered as being incorporated herein by reference.

The essence of the invention lies in the preparation of mono- or dibasic acids by a process wherein the aforementioned aldehyde or dialdehyde is oxidized in an aqueous heterogeneous system with the aid of a suitable oxidizing agent, notably an alkali metal permanganate, e. g. sodium or potassium permanganate. Other oxidizing agents such as chromic acid, potassium dichromate, hydrogen peroxide, organic peroxides such as benzoyl peroxide, cumene hydroperoxide, t-butyl hydroperoxide, oxygen or even air may alternately be used under appropriate conditions, especially where monobasic aldehydes are to be converted to the corresponding monoacids. However, all of these agents are distinctly inferior to the preferred permanganate oxidizing agents in terms of product yield and complexity of by-products, especially where difunctional aldehydes are being treated. Inert diluents such as naphtha, benzene or toluene may also be used, though they are not usually required. However, their use may be advantageous when hydrogen peroxide is used as the oxidizing agent and little or no water is added.

In accordance with the present invention it was discovered that the conversion of an aromatic aldehyde or dialdehyde to the corresponding acid can be effected with unusual efficiency if the aldehyde is oxidized with the aid of a proper oxidizing agent in a heterogeneous aqueous system, rather than in homogeneous phase. Such an oxidation of a dialdehyde is illustrated by the following equation:

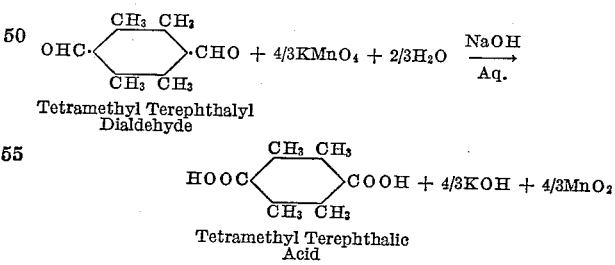

Tetramethyl Terephthalyl Dialdehyde

Tetramethyl Terephthalic Acid

In the case of a monoaldehyde the oxidation reaction can be illustrated as follows:

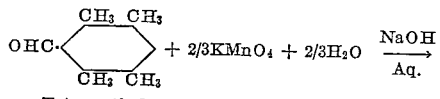

Tetramethyl Benzaldehyde

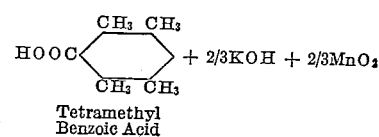

Tetramethyl Benzoic Acid

Of course, since the reaction is preferably carried out in an alkaline medium as hereafter described, it will be understood that the acid is not present as such in the product, but is largely in the form of its soap.

In carrying out the oxidation, the aldehyde is mixed with about 1 to 10 times its weight of an immiscible aqueous medium, e. g. water. Such water aids in keeping the temperature within the preferred limits and otherwise has important beneficial effects on the course of the reaction. In addition it is desirable to add to the reaction mixture enough base such as sodium or potassium hydroxide to convert the resulting acid to its water-soluble soap. For instance, referring to the above equation showing the oxidation of the dialdehyde with permanganate, it will be noted that the permanganate itself produces four-thirds of a mole of alkali metal hydroxide per mole of diacid formed. Consequently, a further addition of two-thirds of a mole of extraneous hydroxide is required in theory to complete the conversion of the acid to its soap. In practice the addition of about 0.7 to 1.5 moles, or preferably about 0.9 to 1.2 moles of hydroxide per mole of dialdehyde feed has been found highly satisfactory. Of course, where a monoaldehyde rather than a dialdehyde is being similarly oxidized, the addition of about 0.4 to 1 mole, e. g., about 0.5 mole of extraneous hydroxide per mole of monoaldehyde feed is sufficient. On the other hand if an oxidizing agent is used which, unlike the permanganate, does not produce any hydroxide in the reaction, larger amounts of extraneous hydroxide may be required since two moles of hydroxide are required to neutralize one mole of dicarboxylic acid product. Accordingly, depending on the nature of the aldehyde being oxidized and the oxidizing agent used, it is advantageous to use about 0.4 to 3 moles of extraneous alkali metal hydroxide per mole of aldehyde feed. Furthermore, where the product yield and reaction rate are not of particular importance and where a satisfactory method is available for separating the acid as such from the oxidized reaction mixture, the addition of hydroxide may be omitted altogether.

A slight excess of the oxidizing agent is then carefully added to the mixture in such a manner that the reaction temperature is preferably kept between about 10 and 30° C. At higher temperatures the reaction has a tendency to run away and selectivity is apt to suffer. When using an alkali metal permanganate to oxidize a dialdehyde, about 1.4 to 2 moles, e. g. about 1.5 moles of the former is used per mole of the latter. When a monoaldehyde is being oxidized, only about 0.7 to 1 mole of permanganate is needed per mole of aldehyde. When other oxidants are used, enough oxidant must be added to give at least one atom of oxygen for each aldehyde group of the compound being oxidized. Upon completion of the reaction the mixture may be separated into a solid filter cake and a liquid portion by filtration. The acid is then precipitated from the filtrate by acidification. The filter cake consists largely of manganese dioxide and some unreacted dialdehyde. This dialdehyde may be separated and recovered from the manganese dioxide by extraction with a suitable solvent, e. g. toluene.

The invention will now be further illustrated by a specific example. Unless otherwise indicated it will be understood that all proportions and percentages of materials are expressed on a weight basis.

*Preparation of 2,3,5,6-tetramethyl terephathalic acid*

A four-way flask equipped with a reflux condenser, a stirrer, a thermometer and a charging port was charged with 50 g. of 2,3,5,6-tetramethyl terephthalyl dialdehyde, 10 g. of NaOH and 500 ml. of distilled water. The mixture was stirred and chilled in an ice bath to 10° C.±3°. To the cool mixture 60 g. of KMnO$_4$ was added in five increments to hold the temperature below 30° C., adding each portion as rapidly as the temperature rise would permit. In two hours all the permanganate was decolorized, indicating substantially complete reduction. The reaction mixture was slightly green. It was heated to boiling to reflux for 15 minutes, to assure that all manganese was converted to the insoluble manganese dioxide form. This is desirable for good filtration and a clean product. A test sample gave a clear colorless filtrate indicating the reaction was complete. The mixture was cooled to room temperature and filtered. Upon acidification of the filtrate, the white tetramethyl terephthalic acid was precipitated. After washing with distilled water and drying, this first fraction weighed 27.0 g. with an acid equivalent weight of 115 (theoretical 111). Additional evaporation and extraction of the filtrate produced 5.5 g. more of the acid with an acid equivalent weight of 117.

The decolorized filter cake, mostly MnO$_2$, was found to contain 18 g. of crude unreacted dialdehyde melting at 148° C. This was recovered by extraction. Accordingly, the conversion was calculated as 64%. The yield of 2,3,5,6-tetramethyl terephthalic acid was 65% based on the total input. The selectivity based on the converted dialdehyde was 87%. The unconverted dialdehyde was not affected and can be recycled to the reaction.

As stated above, the acid equivalent weight of the product was 115 for the main fraction compared to 111 theoretical. This was without benefit of any purifying procedure other than washing with distilled water. The acid was snow white in color. It was not possible to determine the melting point because the acid, when heated, does not melt but undergoes the characteristic sublimation and decomposition above 265° C.

The dialdehyde oxidation was repeated in additional runs which differed in substance from the aforementioned procedure only in that the specified 500 ml. of water were replaced by somewhat larger ratios of other reaction media as summarized in the table below. The aqueous ethanol and aqueous acetone used in runs 3 and 4 produced a homogeneous reaction system whereas water alone gave a heterogeneous reaction system.

TABLE.—Effect of Reaction Medium on Aldehyde Oxidation

| Run No. | Amount of dialdehyde, grams | Reaction medium | Acid equivalent weight of product | Selectivity to dibasic acid, percent | Total conversion, percent |
|---|---|---|---|---|---|
| 1 | 50 | 500 g. water | 115 | 87 | 64 |
| 2 | 25 | 500 g. water | 129 | 72 | 65 |
| 3 | 15 | 500 g. water+250 g. ethanol. | 195 | 14 | 30 |
| 4 | 15 | 500 g. water+250 g. acetone. | 188 | 18 | 50 |

A comparison of runs 1 and 2 indicates that increasing the weight ratio of aqueous medium to aldehyde feed substantially above 10 tends to produce increasing amounts of monobasic acid. This is reflected in run 2 by the higher acid equivalent weight and reduced selectivity to dibasic acid at the same conversion.

Runs 3 and 4 show that the presence of solvents which provide a homogeneous system causes low conversions and low selectivity to dibasic acid, specifically, tetramethyl terephthalic acid. The aqueous acetone gives somewhat better results than the aqueous ethanol, but both of these media are vastly inferior to water alone.

The diacids such as terephthalic or tetramethyl terephthalic, and especially the lower alkyl diesters thereof such as the dimethyl ester of tetramethyl terephthalic acid can be condensed with various difunctional compounds such as glycols, e. g. hexamethylene glycol, or with diamines, e. g. hexamethylene diamine, or with dimercaptans, alkylolamines, etc. to form high molecular weight polymers useful as resins of various sorts. When, as stated earlier, the two carboxyl groups of the diacids are in para-position to each other, they are particularly valuable as intermediates in the formation of linear, fiber-forming polymers.

When the diacids are condensed with monofunctional compounds such as alcohols, monoamines, or monomercaptans, products are obtained which may be useful as insecticides, synthetic lubricants, additives for mineral lubricating oil, and so forth. Similarly, the corresponding esters or other condensation products of the monoacids can be used as insecticides, additives for mineral lubricating oil and, if they have a sufficiently high molecular weight, they themselves can be used as synthetic lubricants. For instance, such a product can be obtained by condensing a monobasic alcohol with an aromatic monoacid whose aromatic nucleus has one or two higher alkyl substituents, e. g. a radical derived from a $C_{13}$ oxo alcohol.

Having described the general nature and specific examples of the invention, it will be understood that the scope and spirit of the invention is not necessarily restricted thereto except as more particularly pointed out in the appended claims.

What is claimed is:

1. In a process for preparing dibasic aromatic acids from a dialdehyde having a benzene nucleus containing attached thereto two aldehyde groups —CHO and up to four alkyl radicals of 1 to 20 carbon atoms, the improvement which comprises mixing said dialdehyde with one to ten times its weight of an aqueous medium immiscible therewith, said medium being added in an amount sufficient to form a two-phase system, adding an alkali metal permanganate in an amount sufficient to oxidize the dialdehyde to the desired acid, also adding sufficient extraneous alkali to convert all of the resulting acid into its alkali metal soap in the course of the oxidation, maintaining the resulting two-phase mixture under reaction conditions, and separating the desired acid from the mixture.

2. A process for preparing tetramethyl terephthalic acid which comprises mixing one mole equivalent of tetramethyl terephthalyl dialdehyde with 1 to 10 times its weight of water and with 1.4 to 2 mole equivalents of an alkali metal permanganate and 0.7 to 1.5 mole equivalents of an alkali metal hydroxide, stirring the resulting heterogeneous mixture while maintaining it at a temperature between about 10 and 30° C., and recovering the resulting tetramethyl terephthalic acid from the reaction mixture.

3. A process according to claim 2 wherein the permanganate is potassium permanganate.

4. A process according to claim 2 wherein the acid is recovered from the reaction mixture by filtering off the aqueous solution of its soap and acidifying the filtrate, and unconverted dialdehyde is recovered by extracting the filter cake.

References Cited in the file of this patent

UNITED STATES PATENTS 939,940      Barstow _____ Nov. 9, 1909

OTHER REFERENCES

Jacobsen: Ber. Deut. Chem. 22 (1889), pg. 1216.
Schmid et al.: Chem. Abstracts 40 (1946), pp. 1487–8.
Wagner et al.: "Synthetic Organic Chemistry," p. 419 (1953).